United States Patent [19]

Beyl

[11] Patent Number: 5,131,291
[45] Date of Patent: Jul. 21, 1992

[54] DEVICE FOR FIXING A SHOE ON A PEDAL OF A BICYCLE OR SIMILAR MACHINE, A BICYCLE PEDAL, A WEDGE AND A SHOE SOLE FOR SUCH A DEVICE

[76] Inventor: Jean J. Beyl, 10, boulevard Victor-Hugo, 58000 Nevers, France

[21] Appl. No.: 596,520

[22] Filed: Oct. 12, 1990

[30] Foreign Application Priority Data

Oct. 16, 1989 [FR] France ................. 89 13484

[51] Int. Cl.[5] ............. G05G 1/14; A43B 5/00
[52] U.S. Cl. ................. 74/594.6; 74/594.4; 36/131
[58] Field of Search ............. 74/594.4, 594.6; 36/131, 132

[56] References Cited

U.S. PATENT DOCUMENTS

| | | | |
|---|---|---|---|
| 4,538,480 | 9/1985 | Trindle | 74/594.6 |
| 4,640,151 | 2/1987 | Howell | 74/594.6 |
| 4,762,019 | 8/1988 | Beyl | 74/594.4 |
| 4,840,086 | 6/1989 | Bidal | 36/131 X |
| 4,882,946 | 11/1983 | Beyl | 36/131 X |
| 5,007,185 | 4/1991 | Lazarski | 36/131 X |

FOREIGN PATENT DOCUMENTS

| | | | |
|---|---|---|---|
| 0169080 | 4/1985 | European Pat. Off. | 74/594.6 |
| 0296898 | 5/1988 | European Pat. Off. | 74/594.6 |
| 0372165 | 6/1990 | European Pat. Off. | 74/594.6 |
| 8620037 | 7/1986 | Fed. Rep. of Germany | 74/594.6 |
| 3832067 | 3/1990 | Fed. Rep. of Germany | 36/131 |
| 3833790 | 4/1990 | Fed. Rep. of Germany | 36/131 |
| 3937358 | 5/1990 | Fed. Rep. of Germany | 36/131 |
| 2556687 | 6/1985 | France | 74/594.6 |
| 2623464 | 11/1987 | France | 74/594.6 |
| 20289 | of 1895 | United Kingdom | 74/594.6 |
| 2099382 | 12/1982 | United Kingdom | 74/594.6 |

Primary Examiner—Vinh T. Luong
Attorney, Agent, or Firm—Cushman, Darby & Cushman

[57] ABSTRACT

The fixing device includes, on the one hand, on the pedal body (2), a front stop (14) situated in front of the axis (X) and a rear fastening element (6) capable of being displaced against an elastic restoring force; on the other hand, an upward retaining elements (14) for cooperating with a retaining element fixed under the sole; finally, moreover, a wedge (15) intended to be fixed beneath the sole, includes towards the front, a front stop elements (38). The wedge (15) includes at least one lower rearwardly projecting fastening flange (31) delimiting a transverse groove (33) issuing at each transverse end; at least one transverse end of the rear flange is provided with a canted surface (35b) inclined along an angle determined in relation to the transverse direction of the wedge, the canted surface (35b) and the portion adjoining the rear flange forming an outwardly convex dihedron. This canted surface (35b) permits the disengagement by the upward escape of the flange (31) for a twist of a predetermined amplitude, in a given direction along an angle that is smaller than the maximum angle of twist wherewith the device still exerts an elastic restoring action on the wedge.

18 Claims, 3 Drawing Sheets

DEVICE FOR FIXING A SHOE ON A PEDAL OF A BICYCLE OR SIMILAR MACHINE, A BICYCLE PEDAL, A WEDGE AND A SHOE SOLE FOR SUCH A DEVICE

BACKGROUND OF THE INVENTION

1. Field of the Invention

The invention relates to a device for fixing a shoe on a pedal of a bicycle or similar machine having a pedal body mounted for rotation about a transverse axis.

The fixing device with which the present invention is concerned is of the kind comprising:
- on the one hand, on the pedal body, front stop means situated ahead of the transverse axis and a rear fastening element situated behind the axis, and comprising a rectilinear fastening edge substantially parallel to the axis, and capable of being displaced along a direction substantially orthogonal to this axis, against an elastic restoring force;
- on the other hand, upward retaining means provided on the pedal body ahead of the transverse axis so as to cooperate with the complementary retaining means provided beneath the sole;
- finally moreover, a wedge adapted to be fixed beneath the shoe sole, this wedge comprising towards its front, front stop means conjugate with that of the pedal and at its rear, fastening means capable of cooperating with the rear fastening edge of the pedal body, it being possible for the engagement of the shoe on the pedal to be obtained by a pressure action of the foot on the pedal, said wedge comprising at least one lower rearwardly projecting fastening flange delimiting a transverse groove issuing at each transverse end, at least one transverse end of the rear flange being delimited by a side inclined along an angle (i) determined in relation to the transverse direction of the wedge, the disengagement being obtained by escaping the flange towards the top by a twist of an amplitude equal to the angle (i) in a given direction.

2. Description of the Prior Art

A fixing device of this kind is shown by DE-U-86 20 037. Such a device has several drawbacks, in particular the following.

The distance separating the two transverse grooves determines at one and the same time the firmness of the twisting opening action and the upward release of the shoe when the elastic bars come tangentially into contact with the cylinder. It follows therefrom, on the one hand, that the unshoeing angle can only be defined by the end of the elastic restoring action and, on the other hand, that near the disengagement position there is virtually no longer any elastic restoring action. This last consequence is particularly irksome because it does not afford the user any proper control of the release of his foot, and untimely disengagements may occur.

If it is considered that a twisting opening of 20° is already large to enable the cyclist to release his shoe quickly, such an opening angle would be clearly insufficient in a device according to DE-U-86 20 037 to obtain a certain retaining firmness in a twisting action, because the restoring moment causes the sine (which is small) of the angle to operate. Otherwise, a heavy and bulky spring exerting a higher force would be necessary.

The engagement of the device in accordance with DE-U-86 20 037 makes it necessary to engage a sleeve in a type of socket which, on the one hand, may make a "blind" engagement difficult, and on the other hand, requires a center of the twisting rotation of the shoe to be coaxial with the axis of the socket. Finally, the cooperation of the socket and of the sleeve eliminates any possibility of a certain freedom of lateral translation of the shoe relative to the pedal.

Another, a fixing device is known, shown by GB 20 289 (MATTHEWS), and in particular, FIG. 6. According to this document, the conditions for fixing and separating the shoe relative to the pedal are defined imprecisely, so that the reliability of the device is not completely satisfactory. Moreover, the vertical pressure of the shoe on the pedal is accomplished with a certain elasticity which is not desirable for sports pedalling.

Moreover, GB-20 289, like U.S. Pat. No. 4,538,480 and U.S. Pat. No. 4,640,151 show that it is known and advantageous to recess the undersole fixing means into the shoe sole so that the cyclist's walking is not impeded.

The primary object of the invention is to provide a fixing device which decreases or eliminates the drawbacks set out with reference to DE-U-86 20 037.

Another object of the invention is to provide a fixing device which, whilst ensuring a good fastening of the shoe on the pedal, makes it possible to obtain a reliable release of the shoe relative to the pedal during a rotational movement of the foot, whilst offering a relatively constant resistance moment during this rotational movement.

In other words, the invention aims to provide a fixing device allowing the release of the shoe in relation to the pedal with a substantially constant resistance or firmness when an angle of rotation has been reached.

Furthermore, it is desired to ensure a firm grip of the sole on the pedal. It is also desirable for the wedge to have small dimensions, so that when it is set into the sole, a large sole area is maintained for walking.

According to the invention, a device for fixing a shoe on a bicycle pedal or similar machine, of the kind defined above, is characterized in that the above mentioned inclined side of the rear flange is constituted by a canted surface forming with the adjacent portion of the rear flange an outwardly convex dihedron;

in that the angle (i) is smaller than the maximum angle of twist wherewith the device still exerts an elastic restoring action on the wedge;

and in that the front stop means and upward retaining means are constituted by one and the same front fixing element, situated ahead of the spindle, fixed relative to the pedal and comprising a practically straight fixing and front stop edge parallel to the spindle, the center of rotation during a twisting movement of the foot, being constituted by a point situated close to the front fastening element.

Preferably, each of the transverse ends of the rear flange comprises a canted surface.

Advantageously, the wedge also comprises a lower forwardly projecting fastening flange delimiting a transverse groove issuing at each transverse end, and the four ends of the flanges of the wedge are provided with canted surfaces that are, in particular, parallel in pairs at opposite ends, the dihedrons formed by these cants being outwardly convex.

Preferably, each canted surface provided for the disengagement of the cyclist's foot by an outward rotation or twisting movement is inclined so as to allow the disengagement with an angle smaller than that necessary for the disengagement by an inward twisting movement of the foot. The angle of inclination of the canted surface for the outward release, in relation to the transverse direction of the wedge, is approximately or equal to 20°, whilst the angle of inclination of the canted surface for a release by an inward twisting movement is larger, in particular of the order of 30°.

Advantageously, the front and rear fastening edges provided on the pedal body, and the transverse grooves of the wedge capable of cooperating with these edges, are arranged to leave scope for transverse sliding of a few millimetres, in particular of the order of 7 mm for the sole and the shoe in relation to the pedal.

The end surfaces of the transverse grooves of the wedge may be arranged in the form of open Vs, the point of the V being respectively turned towards the front for the front surface, and towards the rear for the rear surface.

Viewed in plan, the wedge can have a substantially rectangular shape whose short dimension is orientated along the longitudinal direction, this short dimension being small. The front stop means and the upward retaining means are advantageously constituted by one and the same front fastening element, situated in front of the spindle, fixed relative to the pedal.

Preferably, the distance between the edge of the front stop edge and the rear fastening edge is at most equal to half the transverse dimension of these edges.

Generally, the pedal body comprises a barrel provided with a housing intended to receive the transverse spindle. Preferably, the distance between the stop and fastening edges is substantially equal to the outer dimension of the barrel.

The front stop element is advantageously constituted by a metallic wire, in particular, a high strength steel wire anchored in the pedal body. This wire forms a hoop and has, at the ends of one straight portion constituting the front stop edge, two curved portions substantially orthogonal to the median plane of the pedal, capable of transversely surrounding the forwardly projecting flange of the wedge. The diameter of the steel wire is small, preferably approximately 3 mm.

The rear fastening element may also form a hoop comprising a straight transverse bar provided at its two ends with curved portions forming radially orientated arms for an articulation about a transverse pin, the rear flange of the wedge being capable of being engaged under the bar, whilst being transversely surrounded by the arms.

The ends of the arms remote from the bar may be coiled so as to form two torsion springs; these torsion springs are advantageously accommodated in a recess of the pedal body, the ends of the springs being directed rearwardly and bearing against a side.

The invention also concerns a cyclist's pedal for use with a fixing device such as defined above.

The invention further concerns a wedge intended to be fixed under the sole of a cyclist's shoe so as to cooperate with a device for fixing the shoe on a pedal, in particular as defined above, this wedge comprising a transverse front groove and a transverse rear groove. In accordance with the invention, such a wedge is characterized in that the end surfaces of the transverse grooves of the wedge comprise recesses communicating with the outside via the end and/or the side, in particular to facilitate the removal of earth or mud lodged in the transverse grooves.

The end surfaces of the grooves of the wedge each comprise four posts, that is to say, two median posts and two lateral end posts corresponding to upwardly projecting wedge portions transversely separated from each other, the median posts being interspaced from each other, whilst the end lateral posts are offset towards the median transverse line of the wedge in relation to the median post.

Preferably, the front and rear median posts form respective front and rear ends of longitudinal ribs having a transverse external extension, a provision being made for a hole in the portion of the wedge comprised between the ribs to allow the central recesses to communicate with the outside, whilst a provision is made for a lateral recess on each side of the wedge between the lateral posts situated on the same side, this recess communicating via a passage with the front and rear recesses.

The invention also concerns a sole of a cyclist's shoe intended to be provided with a wedge for a fixing device as defined above, this sole being characterized in that it comprises a recess capable of receiving the upper part of the pedal.

Advantageously, the sole comprises an inner sole made of a rigid material for fixing of the wedge, and an outer sole made of a relatively flexible material having the above mentioned recess, the covering surface of the outer sole extending situated beyond the wedge to prevent wedge with the ground when the user is walking with a shoe provided with such a sole.

Apart from the arrangements set out above, the invention consists of a certain number of other features which will be discussed in greater detail below with regard to a particular embodiment described merely by way of example with reference to the attached drawings, but which is in no way restrictive.

BRIEF DESCRIPTION OF THE DRAWINGS

Finally.

DESCRIPTION OF THE PREFERRED EMBODIMENTS

Figure 1:
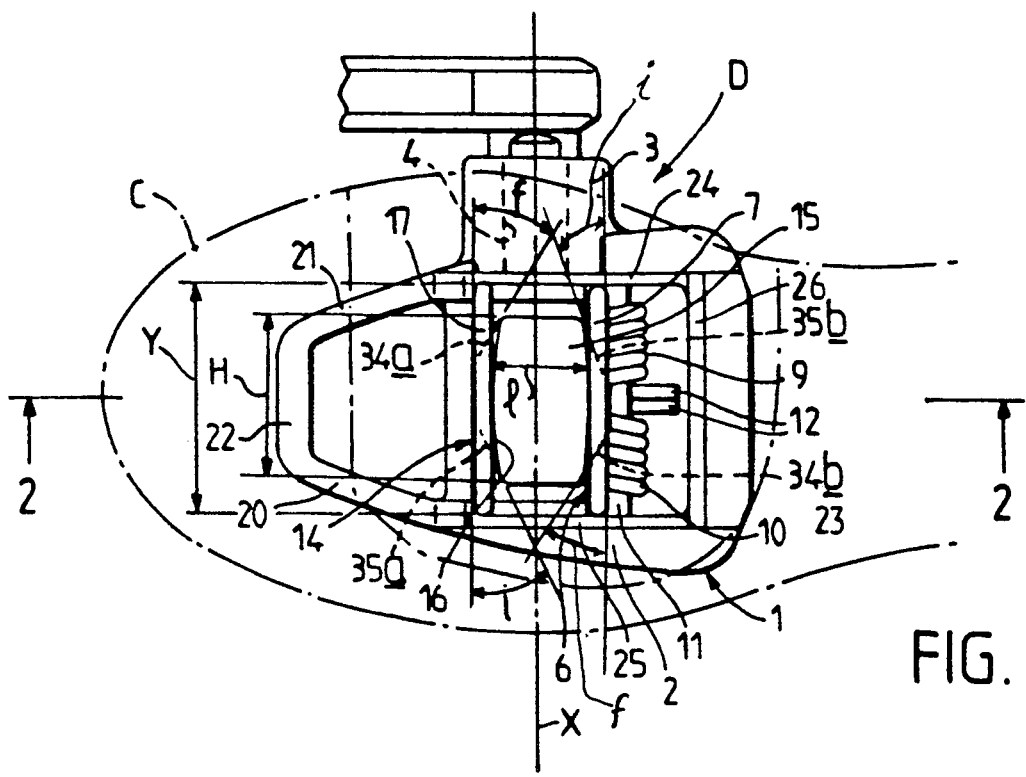
FIG. 1 of these drawings is a plan view of a bicycle pedal and of a shoe in a schematic representation, provided with a fixing device in accordance with the invention.
Figure 2:
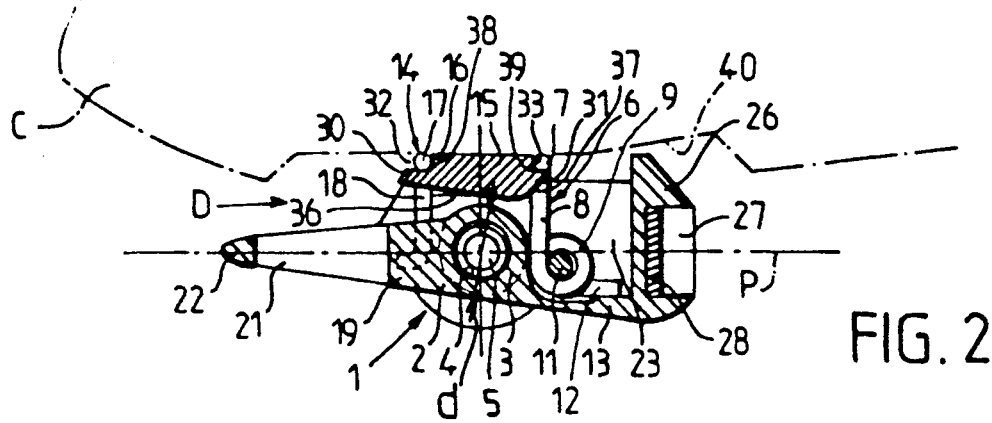
FIG. 2 is a section along line II—II of FIG. 1.
Figure 3:
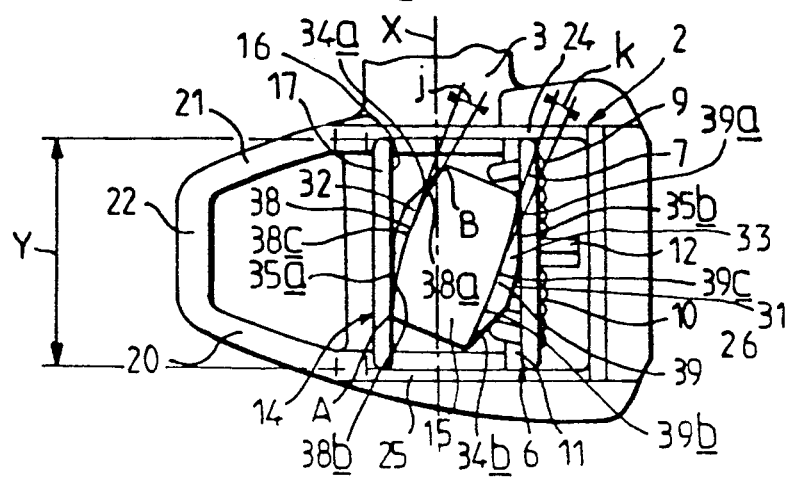
FIG. 3 is a part view similar to FIG. 1, the wedge being turned outwardly (the heel towards the outside) relative to the bicycle.

Referring to the drawings, in particular to FIGS. 1 to 3, there will be seen a device D will be seen for fixing a shoe C on a bicycle pedal 1 having a pedal body 2 comprising a barrel 3 of a substantially cylindrical shape, provided with a housing 4 intended to accommodate a transverse spindle 5 for rotating the mounting of the pedal body on this spindle, with the interposition of ball or needle bearings that have not been shown.

The pedal body 2 comprises a fastening device 6 situated behind the barrel. This fastening device is advantageously made in the form of a hoop by means of a steel spring wire with a circular cross section. It comprises a transverse bar 7 constituting a straight fastening edge, substantially parallel to the transverse geometrical axis X of the barrel about which the pedal can turn. The bar 7 is extended at each end by portions bent substantially at right angles, forming radially orientated arms such as 8 (FIG. 2), substantially orthogonal to the median plane P of the pedal body 2. The ends of the arms 8, remote from the bar 7 are coiled in opposite directions so as to constitute two torsion springs 9, 10 fitted on a transverse rod 11 fixed to the pedal body. The rod 11 is situated below the median plane of the body 2. The adjoining ends 12 of the torsion springs 9, 10 are directed towards the rear and bear against the lower side 13 of the pedal body.

The bar 7 can be displaced rearwardly, along a direction substantially orthogonal to the axis X of the barrel 3 against the elastic restoring force exerted by the springs 9 and 10. The bar 7 describes a circular arc substantially centered on the axis of the rod 11. It should be noted that the expressions "rear", "rearwardly", "forwardly" and "front" used in the text are given with reference to the advancing direction of the bicycle provided with the pedal 1 upright, i.e. with the fastening device uppermost. The front of the pedal is the portion situated ahead f the axis X; in FIGS. 2 and 3, this is the left hand portion, whilst the right hand portion constitutes the rear part.

The rear fastening element 6 and its fastening edge 7 are situated as close as possible to the barrel 3. In actual fact, the radial arms 8 are tangential to the rear surface of the barrel 3. In its state of rest, when the bar 7 is not strained towards the back by external forces, the arms 8 are substantially orthogonal to the median plan P of the pedal body 2.

In the embodiment shown, the pedal body 2 is provided with a front fastening element 14 ahead of the barrel 3 constituting at the same time a front stop means and an upward retaining means cooperating with a wedge 15 fixed beneath the shoe sole.

The front fastening element 14 is fixed relative to the pedal 1 and comprises a straight fastening edge 16, substantially parallel to the axis X. The element 14 is advantageously constituted by a high strength steel wire having a small diameter, in particular, approximately 3 mm.

The device 14 substantially forms a hoop whose main portion is a straight transverse bar 17 parallel to the bar 7. The ends of the bar 17 are curved substantially at right angles so as to form arms 18 which are substantially orthogonal to the median plane P. The ends of the arms 18 remote from the bar 17 are anchored in the body 2. The edge 16 is formed by the lower zone and rear zone of the bar 17.

The two bars 7 and 17 are situated substantially equidistantly from the median plane P and above the upper plane tangential to the barrel 3.

The distance between the front bar 17 and the rear bar 7, when the wedge has not been inserted, is as small as possible. This distance is, at most, equal to half the transverse dimension Y of the bars 7 and 17 and, in practice, is substantially equal to the external diameter d of the barrel 3.

It should be noted that, in cross section, the external shape of this barrel 3 is, as may be seen in FIG. 2, substantially that of a half-cylinder of diameter d, delimited by the bisecting plane of the upper left quadrant and of the opposite quadrant. The pedal body 2 comprises a solid part 19 extending forwardly from the barrel 3. The anchorage of the arms 18 is obtained in this part 19, the arms 18 being substantially tangential to the portion of the circle extending from the half cylindrical contour of the barrel 3.

The solid part 19 of the pedal body is provided on each side with an extension arm 20, 21. These arms converge towards the front and are interconnected by a cross piece 22 at their end remote from the barrel 3. As with the thickness of the arms 20, 21, the thickness of the part 19 along a direction perpendicular to the median plane P progressively decreases with an increasing distance from the barrel 3.

The pedal body 2 has, at the rear, a recess 23 accommodating the springs 9 and 10, this recess being upwardly open and downwardly closed by the plate 13. The recess 23 is defined on the sides by the extensions of two longitudinal sides 24, 25 substantially orthogonal to the plane P, surrounding the elements 6 and 14. A rear transverse end 26 connects the sides 24 and 25 and closes the recess 23. This end 26 comprises a rearwardly opening recess 27 wherein a rear reflector plate 28 may be mounted.

The wedge 15, fixed under the sole by means of screws (not shown), is advantageously metallic, made in particular of a copper aluminium alloy. The fixing of the wedge is effected with scope for adjustment along the longitudinal direction by the sliding of the screws fixing the wedge 15 in oblong slots such as 29, provided in the shoe sole.

Viewed in plan (FIG. 1) the wedge 15 has a substantially rectangular shape whose large dimension H (the transverse direction of the wedge) is oriented parallel to the axis X when the shoe is in its normal median position on the pedal.

The small dimension l is orientated along the longitudinal direction and is preferably less than half the dimension H (H/l > 2).

The wedge 15 comprises two bottom transverse fastening flanges 30, 31 projecting forwardly and rearwardly, respectively.

The flanges 30, 31 define with the lower surface of the sole, two transverse grooves 32, 33 capable of receiving the bars 17 and 7, respectively. The grooves 32, 33 open out at their transverse ends so that the bars 17, 7 can extend beyond the transverse ends of the grooves. In the normal fixing position, the flanges 30, 31 are respectively engaged under the bars 17, 7 of the front and rear hoops of the pedal and are transversely surrounded by the arms 18 and 8 respectively.

The four ends of the two flanges of the wedge are respectively provided with canted surfaces 34a, 34b and 35a, 35b, preferably parallel in pairs with respect to opposing surfaces.

As explained in greater detail below, the canted surfaces 35a, 35b allow the disengagement in the case of an outward twisting movement of the cyclist's foot (that is to say, that the heel of the foot moves outwardly away from the axis of the bicycle). The canted surface 35a is disposed at the outer front end of the wedge 15, whilst the canted surface 35b is situated at the opposite inner rear end.

The canted surface 34a 34b permit the disengagement in the case of an inward twisting movement of the foot.

The angle of inclination i of the canted surface 35a, 35b in relation to the transverse direction of the wedge is approximately or is equal to 20°. The angle of inclination i of the canted surfaces 34a, 34b with the transverse direction of the wedge 15 is greater than i and is preferably of the order of 30°.

The inclination of the canted surfaces in relation to the transverse direction is such that the dihedrons formed with the canted surfaces are outwardly convex, that is to say, towards the front in the case of the front canted surfaces 34a, 35b and towards the rear in the case of the rear canted surfaces 34a, 35b.

The bottom surface of the wedge 15 is substantially constituted by two plane faces 36, 37 having different inclinations relative to the median plane P when the wedge 15 fixed to the shoe is in position on the pedal. The face 36 has a relatively small inclination rearwardly from the front edge of the wedge 15. The face 37 has a more pronounced inclination in the opposite direction so as to rise towards the rear, forming a ramp producing a backward movement of the bar 7 when the shoe exerts a substantially vertical pressure on this bar. The two surfaces 36 and 37 substantially form a rearwardly convex dihedron whose edge is situated towards the rear of the wedge 15.

The end surfaces 38, 39 of the grooves 32, 33, which are substantially orthogonal to the plane P when the wedge 15 is fixed to the shoe on the pedal, form front stop surfaces cooperating with the bars 17 and 7.

These surfaces 38, 39 are advantageously arranged in the shape of open Vs, viewed in plan, as in FIG. 3. The clipped point of the V faces respectively towards the front in the case of the surface 38 and towards the rear in the case of the surface 39. The portions 38a, 38b of the surface 38 are inclined rearwardly slightly in relation to the median transverse direction of the cam to form an angle j of approximately 10°.

The portions 39a, 39b of the rear surface 39 form with the median transverse direction an angle k, which is preferably smaller, for example, approximately 5°.

This arrangement of the slopes on the wedge 15 allows various degrees of opening firmness to be obtained during the rotation of the wedge, as illustrated in FIG. 3.

For an angle of rotation from 0° to approximately 5°, the firmness is practically zero, which provides angular freedom for the cyclist's foot. This angular freedom is obtained by a light elastic restoring action because of the median portions 38c, 39c (of the surfaces 38, 39) being parallel to the median transverse direction of the wedge 15. These portions 38c, 39c correspond to the point of the Vs of the surfaces 38, 39, which has been clipped.

During an outward twisting movement of the cyclist's foot (the heel of the foot moves laterally away from the bicycle) the wedge 15 turns as shown in FIG. 3. The center of rotation of the shoe sole is then constituted by the point A (see also FIG. 6) situated at the outer end of the surface 38 bearing against the fixed top 14. For inward twisting movements, it is the other end B of the surface 38 which comes to bear against the bar 17 and which constitutes the center of rotation for the shoe.

As a variant, the end surface 38 could, viewed in plan, be defined by two sides of a triangle whose apex would bear against the fixed stop and whose base would be formed by the end surface 39.

The bars 7 and 17 and the wedge 15 are arranged so that the shoe secured to the pedal can be displaced transversely, that is to say, parallel to the axis X by a certain amplitude. For this purpose, the bars 7 and 17 extend substantially along the whole width of the pedal 1, whilst the transverse dimension H of the wedge 15 is less than the distance between the inner opposite faces of the arms 8 or 18. Preferably, provision is made for a transverse play of approximately 7 mm between the wedge and the arms 8, 18 so that the wedge 15 and the shoe can be displaced laterally by 7 mm. This allows the cyclist to adjust by himself the lateral position of his foot on the shoe according to his build.

The length of the front flange 30 may be reduced to facilitate the disengagement of the shoe from the pedal in the case of a forward fall.

Figure 4:
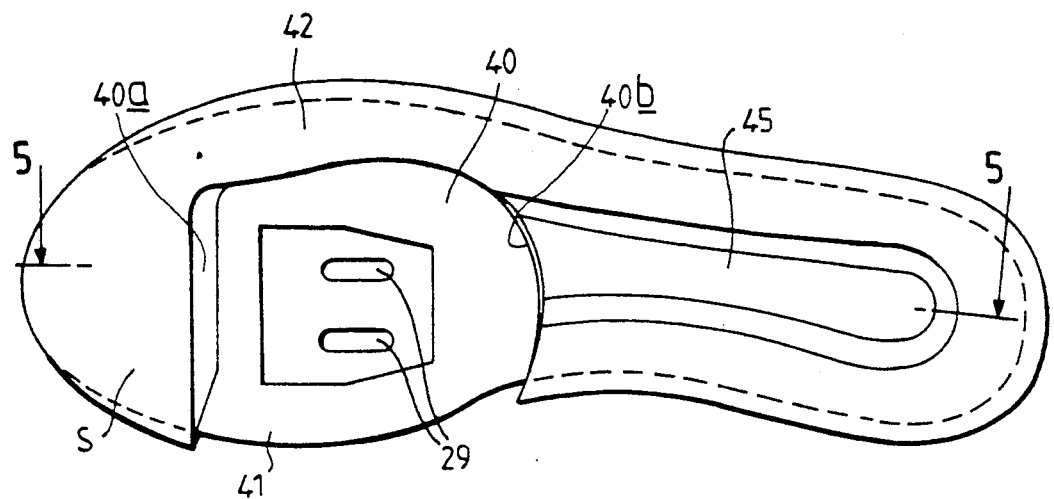
FIG. 4 is a bottom view of a shoe sole intended to receive the wedge of the fixing device.
Figure 5:
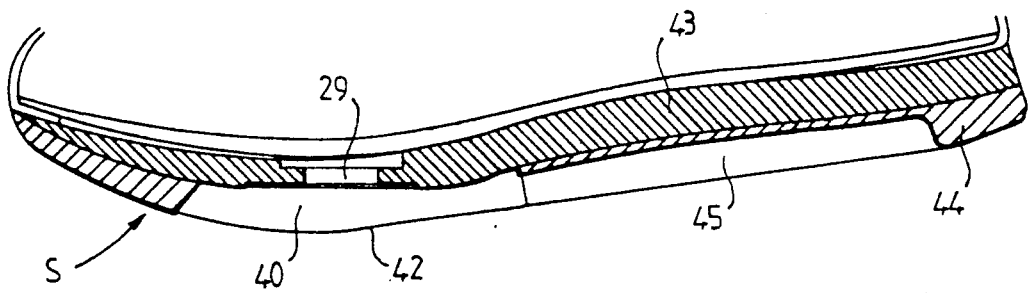
FIG. 5 is a section along line V—V of FIG. 4.

The sole S of the shoe C comprises a recess 40 (FIGS. 4 and 5) in the region situated below the joint of the big toe. As shown in FIG. 2, this recess 40 is capable of receiving the upper portion, in particular the rear upper portion, of the pedal. The wedge 15 is intended to be fixed in the recess 40 which opens out at 41 on the inner edge of the shoe and which is closed on the outer side by an edging 42. The recess 40 is sufficiently deep to ensure that the wedge 15 is not in contact with the ground when the cyclist is walking on the ground with such a shoe. In other words, the wedge 15 is situated inside a line extending the sole S across the recess 40. The dimensions of this recess are sufficient to allow the deflections of the various components of the fixing device during the positioning of the shoe on the pedal and its separation therefrom. The front edge 40a of the recess 40 extends transversely forwardly along an inclined plane, whilst the rear edge 40b forms a substantially circular curved arc, with its concavity facing forwards.

Preferably, the sole S comprises an inner sole 43 of a rigid material, comprising in particular a metallic plate for fixing the wedge 15, and an outer sole 44 of a relatively flexible material, wherein provision is made for the above mentioned recess 40. In the longitudinal median portion, this sole 44 may comprise a groove 45 which is connected to the recess 40 and which is closed towards the rear.

It should be noted that the shoe sole bears only on the bars 7 and 17, the wedge 15 not bearing on the barrel 3, as is best seen in FIG. 2. The presence of the rigid sole 43 allows the cyclist to pedal without feeling the pressure of the bars 7 and 17. The flexible sole 14, with (an outwardly convex) curvature in the metatarsal region, facilitates walking.

The functioning of the fixing device in accordance with the invention is as follows:

When the cyclist wishes to form the connection between his shoe fitted with the wedge 15 and the corresponding pedal, he proceeds as follows:

The pedal 1 is designed so that when at rest, its front edge 22 is raised whilst its rear edge is lower.

The cyclist engages the bar 17 in the groove 32 and pushes forwardly and downwardly with his foot so that the inclined surface 37 will push the bar 7 rearwardly against the torque exerted by the springs 9 and 10. The bar 7 will be moved rearwardly, allowing the rear edge 31 to pass. When the bar 7 is opposite the groove 33, the action of the springs 9 and 10 produces a slight forward movement of the bar 7 to engage the groove 33. The shoe is then fixed on the pedal 1.

Since the length of the wedge 15 (that is to say, its dimension 1 in the longitudinal direction) is as small as possible, the length of the pedal can be small. The setting in, and hence the recess 40, is small in the sole S, which allows a large area of the sole S to be set aside for walking.

As already explained, during an outward rotation, the practically rectangular wedge 15 pivots around its front left angle A by bearing on the front stop or bar 17 and by pushing back the bar 7 which is elastically strained for the hold. With such a system, twisting the shoe sole S may effect a wide travel of approximately 60° whilst being subjected to an elastic restoring action, tending to bring it back into the longitudinal axis of the pedal. Of course, a cyclist would not voluntarily effect an angular twisting movement as great as 60°. This constitutes a protection against an untimely unshoeing.

The removal of the shoe from the pedal is obtained by an upward release of the shoe, relative to the pedal, after a twisting opening angle greater than that which would be encountered in the most violent pedalling has been reached, it nevertheless remaining relatively easy for the cyclist to produce this angle in a deliberate movement.

Experience has shown that an angle of 20° is suitable, with the heel of the foot outward. This explains why the rear canted surface 35b and preferably also the front canted surface 35a form an angle i equal to 20° with respect to the median transverse direction. When a twisting movement of 20° has been reached as shown in FIG. 3, the canted surface 35b becomes tangential to the rear bar 7 and the wedge 15 is no longer prevented from moving upwards. The shoe is then released from the pedal. This release is even more clearly defined the front canted surface 35a has the same inclination as the rear canted surface 35b since there is a simultaneous release at the front and at the back.

It should be noted, however, that the rear release in the region of the single rear canted surface 35b (preferably situated at the inner rear angle of the wedge, to ensure the disengagement by twisting towards the outside) is sufficient and that the front canted surface 35a could have a greater inclination relative to the median transverse direction and remain slightly engaged beneath the front bar 17. In fact, because of the upward traction exerted by the cyclist on the shoe, as the rear edge 31 is released upwards, as viewed in FIG. 2, the pedal has a tendency to turn in a clockwise direction around the spindle 5 and to be separated from the shoe, which allows the release of the front flange 30 towards the rear in relation to the bar 17.

Provision is preferably made for the inward removal of the shoe (the heel of the foot moving towards the bicycle), for a greater unshoeing angle, for example of 25° or 30° (the angle f formed between the canted surface 34b, and preferably also 34a with the median transverse direction) for better protection against an untimely unshoeing which would for example, risk the foot being brought into contact with the rear wheel. This possible inward unshoeing at 25° or 30° is above all useful for removing the shoe when the cyclist is on the ground after a fall.

Finally, it is apparent that to obtain the release of the shoe from the pedal, it is not so much a firmness (opening force) that has to be overcome, but rather an opening angle which has to be attained at a substantially constant level of firmness.

Figure 6:
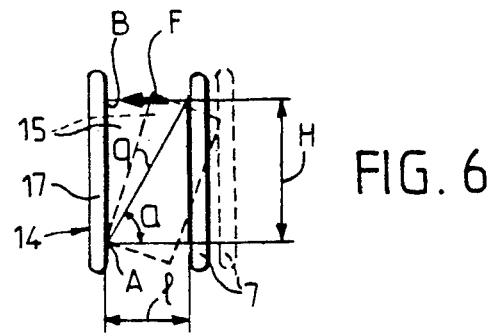
FIG. 6 is an explanatory diagram.

In fact, as may be seen from FIG. 6, if the force exerted by the bar 7 at the end of the wedge on the side opposite to the center of rotation A is designated by F, and if the diagonal of the wedge 15 is designated by g, the resistance moment that the cyclist has to overcome to make his shoe turn is $M = Fg\sin a$. The angle a is that formed between the diagonal and the median longitudinal direction.

The force of the spring shows a linear increase during the opening, whilst the lever arm $g\sin a$ decreases during the opening. Hence the opening firmness remains substantially constant. The low amplitude twisting movements are thus absorbed during pedalling. On the other hand, this force may have a relatively low value since the shoe removal does not depend on the force to be overcome but on the angle to be reached.

Figure 7:
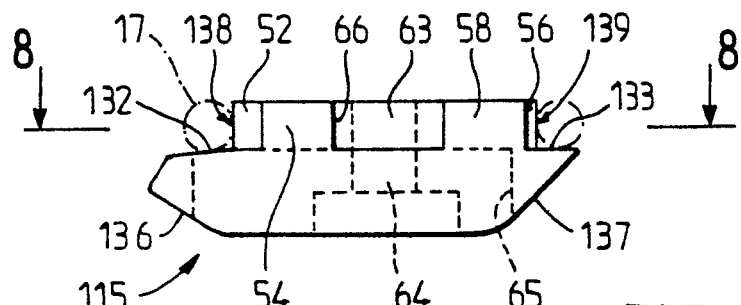
FIG. 7 is an elevational view on an enlarged scale, of a variant of the embodiment of the wedge.
Figure 8:
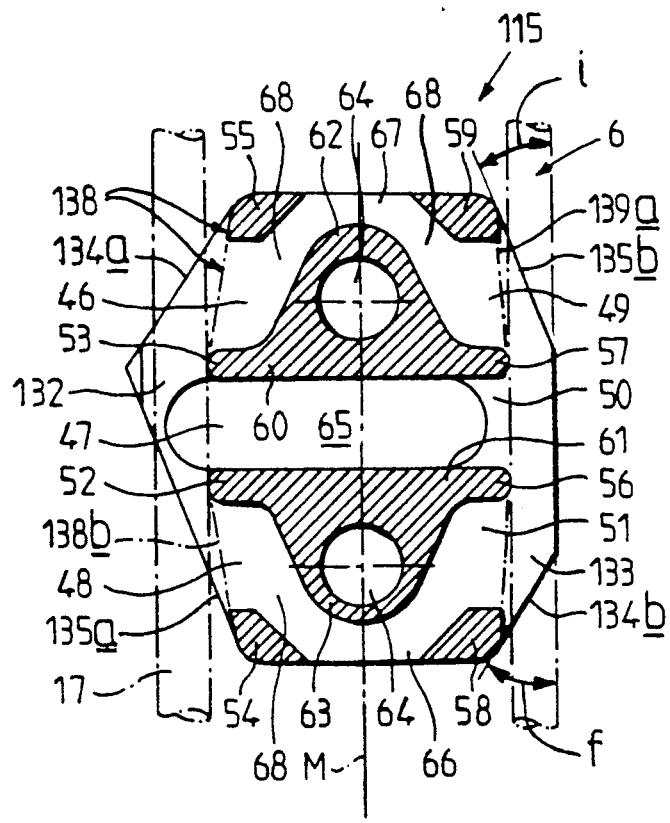
FIG. 8 is a section along line VIII—VIII of FIG. 7.

FIGS. 7 and 8 show a variant 115 of the embodiment of the wedge intended to be fixed beneath the sole. The parts of this wedge which are similar to, or which perform functions equivalent to, parts already described with reference to the preceding Figures, are designated by corresponding reference numerals but increased by 100.

The description of these parts will not be repeated or only briefly referred to.

The wedge 115 comprises, in the surfaces of the ends 138, 139 of its transverse grooves 132, 133, recesses 46, 47, 48 for the front surface 138 and recesses 49, 50, 51 for the rear surface. As explained below these recesses communicate with the outside when the wedge is fixed beneath the shoe, and fastened on the pedal. In particular these recesses permit an easier evacuation and removal of the earth and mud which may be lodged in the grooves 132, 133 when the cyclist is walking.

The end surface 138 situated towards the front, comprises four posts for the bar 17 of the pedal, that is to say, two median posts 52, 53 transversely interspaced from each other and two lateral end posts 54, 55. The median recess 47 is positioned between the median posts 52, 53 whilst the lateral recesses 46, 48 are positioned respectively between the posts 53, 55 and 52, 54. The arrangement of the rear end surface 139 is similar with two median posts 56, 57 and two lateral end posts 58, 59.

The various posts correspond to upwardly projecting portions of the wedge 115, as shown in FIG. 7 and are capable of coming to bear against the sole of the shoe.

The median posts 52, 53 and 56, 57 respectively are equidistant from the transverse median line M of the wedge 115, whilst the end posts 54, 55 on the one hand, and 58, 59 on the other hand, are offset relative to the corresponding median posts towards the transverse median line M. Thus, the imaginary plane surface 138a extending between the post 53 and post 55 has an inclination in relation to the transverse median direction M similar to the inclination j referred to with reference to the surface 38 of FIG. 3. The same applies to the imaginary surface 138b extending between the post 52 and the post 54. The rear imaginary surfaces 139a, 139b have an inclination corresponding to the angle k of FIG. 3.

In such an arrangement, when the shoe and the wedge 115 occupy their median positions, the bar 17 bears against the posts 52 and 53, whilst the bar 6 bears against the posts 56, 57. The lateral end posts 54, 55 and 58, 59 are not in contact with the bars 6 and 17. These posts only come into contact with the bars during a rotation of the shoe fitted with the wedge 115. The median posts such as 53, 57 and 52, 56, situated on the same side in relation to the median longitudinal direction of the wedge, form the preferably rounded off ends of longitudinal ribs 60, 61 respectively, having an outward transverse extension 62, 63. These extensions 62, 63 have an end rounded off towards the outside and are defined by sides converging towards the outside. In each extension 62, 63, provision is made for a hole 64 for a screw to attach the wedge to the sole.

The wedge 115 has an oblong slot 65 between the ribs 60, 61, this slot 65 extending downwardly to allow the central recesses 47, 50 to communicate with the outside when the shoe fitted with the wedge is in position on the pedal.

On each side of the wedge 115 is a lateral recess 66, 67 between the lateral posts situated on the same side 54 and 58, and 55 and 59 respectively. Each recess 66, 67 communicates via passages 68 between the median posts and the lateral posts, with front and rear lateral recesses 46, 48 and 49, 51.

If such a wedge 115 is filled with earth or mud in the grooves 132, 133 intended to receive the bars 17 and 6 when the shoe is positioned on the pedal, the thrusting action of the bars 17 and 6 will eject the earth or mud through the recesses 46–51, 66, 67 and the oblong slot 65, so that the virtually point contacts can be satisfactorily established between the bars 17 and 6 and the posts of the wedge such as 52, 53 and 56, 57.

The functioning of the fixing device with a shoe fitted with the wedge 115 is similar to that described above with regard to FIGS. 1 to 6.

According to the present invention, the angular and lateral adjustments are obtained by the pedal. They can be modified at any time and automatically at the discretion of the user, who will not be obliged to carry out a tedious manual adjustment of the wedge under the sole of the shoe.

The elastic retention is exerted in the direction of a twisting movement of the foot in a plane parallel to the upper surface of the pedal.

The release of the shoe is effected upwards.

The angle (i) of the upward release is less important than the angle that can be obtained by the elastic restoring action. Nevertheless, the angle (i) which has been chosen for the upward release is greater than the angle that the shoe would form with the longitudinal axis of the pedal in sudden movements of acrobatic pedalling, for example standing on the pedals. In accordance with the invention, this angle has been determined to be approximately 20° for the unshoeing.

Angular and lateral freedom is obtained automatically by the pedal.

I claim:

1. The combination of a pedal of a cycling machine and a device for fixing a shoe on said pedal, said pedal being of the type having a pedal body mounted for rotation about a transverse axis, the pedal body having front and rear portions:

said pedal body having front stop means situated between the axis and the front portion, a rear fastening element attached to the pedal body disposed between the axis and the rear portion, said rear fastening element having a rectilinear fastening edge for extending substantially parallel to the axis, said rear fastening element being resiliently displaceable in a direction substantially orthogonal to the axis, said front stop means serving as upward retaining means for restraining upward as well as forward movement of the shoe, a wedge member having means for attachment thereof to a sole of the shoe, said wedge member having a front and a rear portion, a front stop portion disposed adjacent said front portion of said wedge member and complementary to said front stop means and a rear fastening portion disposed adjacent said rear portion and complementary to said rear fastening element of the pedal body, said wedge member having a substantially rectangular shape the large dimension of which is oriented parallel to the axis of the pedal, said rear fastening portion comprising at least one rearwardly projecting flange defining a groove extending transverse to said wedge member, said wedge member having opposite sides and said groove having opposite ends each lying on the respective side, said wedge member having a transverse axis and at least a portion of said flange adjacent one of said sides being inclined so as to intersect said transverse axis of said wedge member at an angle i, with said angle corresponding to an angle of twist required to be imposed on said wedge member in a predetermined direction to allow a release of said flange from said rear fastening element, said flange having another portion adjacent said inclined portion, which portions together form a first canted section of said flange with said first canted section defining an outwardly convex dihedron, said angle i being smaller than a maximum angle of twist of said wedge member within which said rear fastening element still exerts a restoring force on said wedge member, said front stop means including a substantially straight stop edge fixed relative to the pedal body for extending parallel to the transverse axis of the pedal body and including a point of rotation of said wedge member thereon when said wedge member is attached to the pedal body and twisted in said predetermined direction relative to the pedal body.

2. The combination as claimed in claim 1 wherein said rearwardly projecting flange of said wedge member at the opposite side to said one side includes a second canted section having an inclined portion.

3. The combination as claimed in claim 1 or 2 wherein said wedge member includes a forwardly projecting fastening flange defining a forward transverse groove extending from one side of said wedge to the opposite side thereof, said forwardly projecting fastening flange including third and fourth canted sections complementing said first and second canted sections of said rearwardly projecting flange so that each said flange has an outwardly convex dihedron.

4. The combination as claimed in claim 3 wherein said one side of said wedge member is for locating on the inner side of the pedal body and said opposite side of said wedge member is for locating on the outer side of the pedal body, said inclined portion of said rearwardly projecting flange located adjacent said one side is inclined at the angle i that is smaller than that angle f of said inclined portion located adjacent said opposite side of said wedge member whereby the angle of twisting of said wedge member to disengage said wedge member is less for outward movement than for inwardly directed twisting of said wedge member.

5. The combination as claimed in claim 4 wherein said angle i for said inclined portion located adjacent said one side is approximately 20° said angle f for said inclined portion located adjacent said opposite side is approximately 30°.

6. The combination as claimed in claim 1 or 2 wherein said front stop means and said rear fastening element are shaped to cooperate with said front stop and rear fastening portions of said wedge member to allow limited relative sliding movement therebetween.

7. The combination as claimed in claim 1 or 2 wherein said front stop portion of said wedge member comprises a groove extending transversely of said wedge member, each said respective groove of said front and rear portions of said wedge member including two surface portions which intersect at approximately a midpoint of a length of the respective groove to form a V shape with an apex of the V shape of said front stop portion pointing forwardly while that of said rear fastening portion points rearwardly.

8. The combination as claimed in claim 1 or 2 wherein said front stop portion and rear fastening portion each have a selected transverse dimension and a distance therebetween is no greater than one half said selected transverse dimension.

9. The combination as claimed in claim 1 or 2 therein the pedal body includes a barrel housing for receiving a spindle, the barrel housing having an outer diameter and a distance between said rectilinear fastening edge and said straight stop edge being substantially equal to the outer diameter.

10. The combination as claimed in claim 1 or 2 wherein said front stop means comprises a metallic wire.

11. The combination as claimed in claim 10 wherein the pedal body lies in a plane and said metallic wire is in the shape of a hoop having a straight bridging portion having opposite ends each having a leg portion for extending substantially perpendicular to the plane of the pedal body, said leg portions being spaced apart by said bridging portion a distance sufficient to receive said front stop portion of said wedge member.

12. A device as claimed in claim 10 wherein said metallic wire has a diameter of approximately 3 mm.

13. The combination as claimed in claim 1 or 2 wherein said rear fastening element comprises a hoop shaped member including a straight, transverse bar having opposite curved ends from each of which an arm extends substantially perpendicularly to said bar, each said arm terminating in a gripping portion with a pin member being received in said gripping portion of each said arm, said arms being spaced apart a distance sufficient to receive said rear fastening portion of said wedge member.

14. The combination as claimed in claim 13 wherein each said gripping portion is in the form of a coiled torsion spring, each said torsion spring having an arm portion extending therefrom for engaging a recess in the pedal body.

15. The combination as claimed in claim 1 or 2, wherein the sole is provided with a recess for receiving the wedge member.

16. The combination as claimed in claim 15 wherein said shoe includes an inner sole of rigid material and an outer sole of a relatively flexible material which includes a section having a thickness greater than the thickness of said wedge member.

17. The combination as claimed in claim 1, wherein the extent of twist during which the wedge remains under the effect of an elastic restoration force is approximately 60°.

18. The combination as claimed in claim 1, wherein said pedal body includes a shaft and a rear hooking edge which is formed by a first bar and a front hooking edge which is formed by a second bar, said bars being situated above the upper tangent plane of said pedal shaft, within which is provided a housing for the transverse side of said pedal.

* * * * *